Aug. 13, 1929.   A. C. ROHM, JR   1,724,725
CHILD'S WHEELED VEHICLE
Filed Sept. 22, 1927   3 Sheets-Sheet 1

A. C. ROHM JR. INVENTOR
BY Merrill M. Blackburn
ATTORNEY

Aug. 13, 1929.  A. C. ROHM, JR  1,724,725
CHILD'S WHEELED VEHICLE
Filed Sept. 22, 1927   3 Sheets-Sheet 2

A. C. ROHM JR. INVENTOR
BY Merrill M. Blackburn
ATTORNEY

Aug. 13, 1929.  A. C. ROHM, JR  1,724,725
CHILD'S WHEELED VEHICLE
Filed Sept. 22, 1927   3 Sheets-Sheet 3

A. C. ROHM JR. INVENTOR.
BY
Merrill M. Blackburn
ATTORNEY

Patented Aug. 13, 1929.

1,724,725

UNITED STATES PATENT OFFICE.

ALBERT C. ROHM, JR., OF DAVENPORT, IOWA.

CHILD'S WHEELED VEHICLE.

Application filed September 22, 1927. Serial No. 221,208.

My invention pertains to that class of children's wheeled vehicles which are provided with means to make them simulate an aeroplane and among the objects of my invention are to provide a sturdy, inexpensive wheeled vehicle for children; to provide improved driving means in a device of the character described; to provide improved steering means in a vehicle of the character indicated; to provide an inexpensive wheeled vehicle of the character indicated which will furnish to children a maximum of pleasure at a minimum of expense; and such further objects, advantages and capabilities as will hereafter appear and as are inherent in the construction disclosed. My invention further resides in the combination, construction and arrangement of parts illustrated in the accompanying drawings and, while I have shown therein what is now considered the preferred embodiment of my invention, I desire it understood that the attached drawings are merely illustrative and are not to be taken in a limiting sense.

Figure 1:
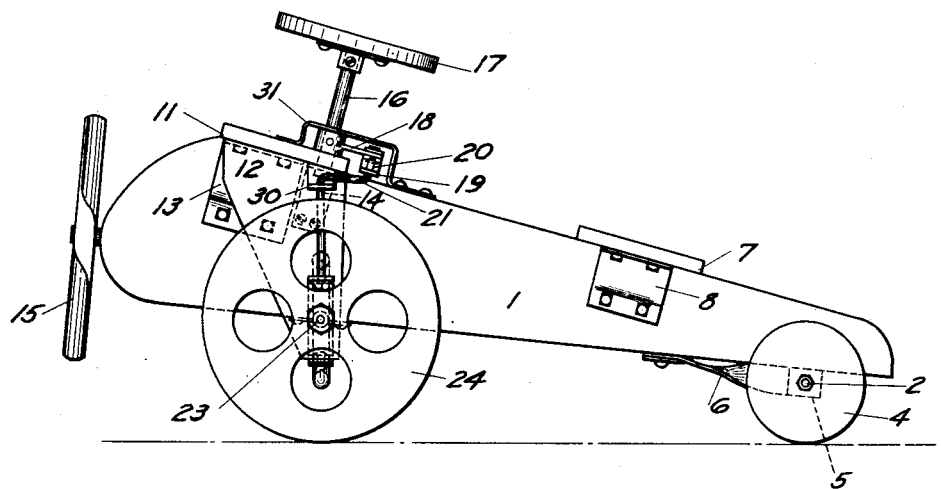
Figure 2:
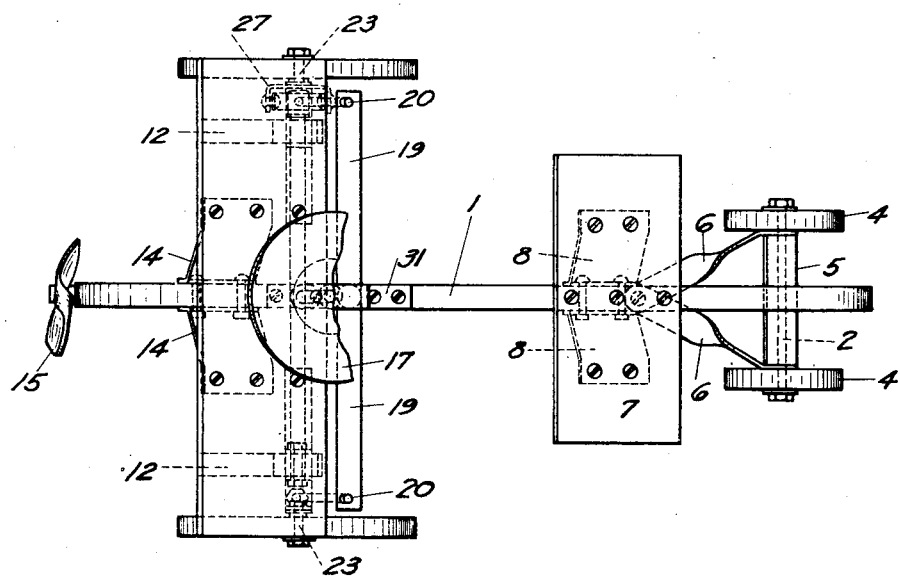
Figure 3:
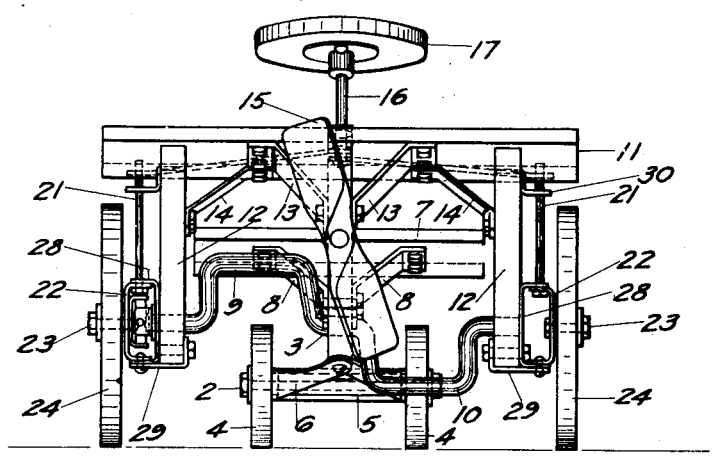
Figure 4:
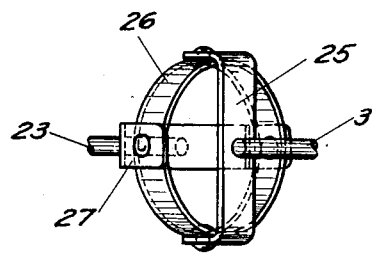
Figure 5:
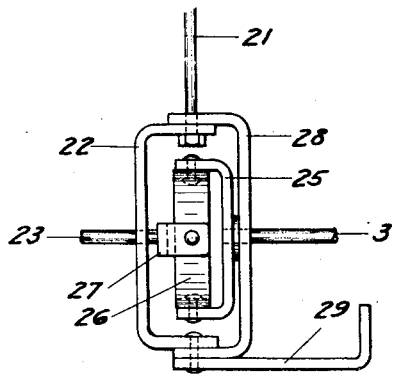
Figure 6:
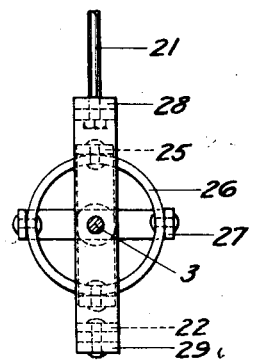
Figure 7:
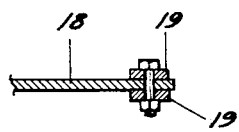
Figure 8:
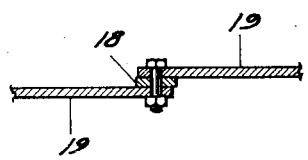
Figure 9:
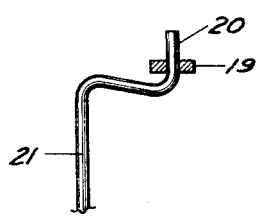

In the drawings attached hereto and forming a part hereof, Fig. 1 is a side elevation of my device; Fig. 2 is a plan view of the construction shown in Fig. 1, with a part of the steering wheel broken away; Fig. 3 is a front elevation of this device; Fig. 4 is a perspective view of the universal joint in the drive shaft for the driving wheel; Fig. 5 is an enlarged detached view of the combined driving and steering joint at the left side of Fig. 3; Fig. 6 is a sectional elevation of this structure as viewed from the right side of Fig. 5; Fig. 7 is a longitudinal central section through the steering joint above the body 1, this joint being shown in Fig. 1; Fig. 8 is a similar transverse view of this same joint; Fig. 9 is a vertical section through the connection of crank 20 with either link 19, the same being shown in plan in Fig. 2.

Referring more in detail to the annexed drawings, numeral 1 denotes a thin flat body arranged in a vertical plane and having an axle 2 and crank shaft 3 secured to the lower edge thereof. The rear axle 2 passes through a supporting member or block 5 and carries at its extremities the rear wheels 4. Braces 6 are shown as extending across the ends of the block 5 and surrounding the axle 2 and having their forward extremities secured to the under side of the body 1 by a suitable means such as a screw. A rear plane 7 is secured upon the upper side of the body 1 and braced thereto by the braces 8, as shown most clearly in Figs. 1 and 2. This rear plane serves as a seat for the child whose legs extend upon opposite sides of the body 1 to the cranks 9 and 10 of the crank shaft 3.

The forward plane 11 is mounted upon the top of the body 1 adjacent its forward end and has its extremities supported upon the crank shaft 3 by the supporting brackets 12. Braces 13 and 14 connect this plane with the body 1 and the brackets 12 to make the structure rigid. A propeller 15 is mounted at the forward end of the body 1.

Carried by the upper end of the steering post 16 is a steering wheel 17 and secured to the steering post is a crank arm 18 which is connected in driving relation with an end of each of two links 19. The other ends of these links are connected to the upturned ends 20 of cranks 21 whose lower ends are connected fixedly to the yokes 22 in which are rigidly mounted the axles 23 of the front wheels. It will thus be seen that when the steering wheel is turned the crank 18 will be swung to right or left, moving the links 18, cranks 21, yokes 22, axles 23 and front wheels 24 correspondingly.

It is necessary to have a driving connection between the crank shaft 3 and one of the axles 23 and this is shown at the left in Fig. 3 and in detail in Fig. 4. Referring more particularly to Fig. 4, shaft 3 is shown as rigidly connected to the yoke 25 which is pivotally connected to the ring 26. The latter is in turn pivotally connected to the yoke 27 which is rigidly secured to the shaft or axle 23. It will therefore be seen that as the crank shaft 3 is turned rotation of axle 23 will be caused. Also, with this arrangement, driving of the wheel may take place thru this universal joint whether the vehicle be going directly forward or in a curved line, the universal joint permitting driving to take place, regardless of whether or not axle 23 is in line with crank shaft 3. The yokes 28 are secured to yokes 22, brackets 29 and braces 12 as is evident from Fig. 3 without further description. The upper portions of cranks 21 are supported from the under side of the forward plane by means of the brackets 30. A bracket 31 is secured at its ends to the forward plane 11 and to the body 1, as is apparent from Fig. 1 and serves to hold the steering post against being withdrawn from its seat in the plane and body.

Having now described my invention, I claim:

1. In a child's wheeled vehicle, supporting and driving wheels; a body supported thereby and extending thereabove in a substantially vertical plane; a seat secured upon the upper edge of the body and corresponding to the rear plane of an aeroplane; a front plane upon the upper edge of the body adjacent its front end; a drive shaft beneath the body and front plane, said drive shaft having driving connection with one of the wheels and rotating independently of the other; and means for turning the front wheels to steer the vehicle.

2. In a child's wheeled vehicle having front and rear supporting wheels; means for turning the front wheels to steer the vehicle; a crank shaft for propelling the vehicle; and a connection from the crank shaft to one of the wheels whereby said wheel may be rotated from the crank shaft and may be permitted to turn to effectuate steering of the vehicle.

3. In a child's vehicle, a vertically disposed body, front and rear supporting wheels supporting said body, front and rear planes on said body, a drive shaft connected to one of said wheels to cause turning thereof to propel the vehicle, a universal joint in said drive shaft permitting the turning of the wheel to cause steering of the vehicle and means to cause the turning of the wheels for the last named purpose.

4. In a vehicle of the character described having a body and supporting wheels therefor; a crank shaft connected to one of the wheels in driving relation to drive the same, a universal joint in said crank shaft permitting said driven wheel to turn about a substantially vertical axis, yokes connecting the steering wheels to the vehicle body in a manner to permit them to turn on substantially vertical axes, cranks connected to the yokes to turn the wheels, a steering post, and connections between the steering post and cranks whereby the steering wheels may be turned to steer the vehicle.

In witness whereof, I hereunto subscribe my name to this specification.

A. C. ROHM, Jr.